United States Patent [19]

Takayama et al.

[11] Patent Number: 4,469,009

[45] Date of Patent: Sep. 4, 1984

[54] PNEUMATIC BOOSTER

[75] Inventors: Toshio Takayama, Kanagawa; Hiromi Ando, Tokyo; Mitsuhiro Endou, Kanagawa, all of Japan

[73] Assignee: Tokico Ltd., Kanagawa, Japan

[21] Appl. No.: 378,232

[22] Filed: May 14, 1982

[30] Foreign Application Priority Data

May 20, 1981 [JP] Japan .............................. 56-72835[U]

[51] Int. Cl.³ .......................... F15B 9/10; F01B 19/00
[52] U.S. Cl. ................................ 91/376 R; 91/369 A; 92/99
[58] Field of Search ............. 91/369 A, 369 B, 369 R, 91/376 R; 92/99, 98 D, 169 A, 169 B, 169 C; 60/547.1

[56] References Cited

U.S. PATENT DOCUMENTS

| | | | |
|---|---|---|---|
| 2,828,719 | 4/1958 | Ayers, Jr. ........................... | 91/369 B |
| 2,894,490 | 7/1959 | Ingres ................................ | 91/369 B |
| 3,183,789 | 5/1965 | Stelzer ............................... | 91/369 B |
| 3,661,054 | 5/1972 | Brown ............................... | 91/369 B |
| 4,406,213 | 9/1983 | Hoor .................................. | 92/98 D |

Primary Examiner—Paul E. Maslousky
Attorney, Agent, or Firm—Wenderoth, Lind & Ponack

[57] ABSTRACT

A pneumatic booster includes a housing, a power piston and flexible diaphragm assembly partitioning the interior of the housing into two chambers, a poppet valve mechanism for selectively connecting or disconnecting communication between the two chambers and disconnecting or connecting communication between one of the chambers and a reference pressure, an input rod for actuating the poppet valve mechanism and an output rod connected to the power piston. The poppet valve mechanism includes a plunger connected to the inner end of the input rod, a valve member, a valve body having an axial bore therein for slidably receiving the plunger, and a restricting member mounted on the plunger for restricting the relative axial displacement of the plunger and the valve body. A resilient member is interposed between the restricting member and the valve body to avoid impacting abutment between the restricting member and the valve body.

2 Claims, 9 Drawing Figures

PNEUMATIC BOOSTER

BACKGROUND OF THE INVENTION

This invention relates to a pneumatic boosters and, particularly to pneumatic boosters of the kind including a housing, a power piston and flexible diaphragm assembly partitioning the interior of the housing into two chambers, a poppet valve mechanism for selectively connecting or disconnecting communication between the two chambers and disconnecting or connecting communication between one of the two chambers and a reference pressure, an input rod for actuating the poppet valve mechanism and an output rod connected to the power piston.

The poppet valve mechanism conventionally comprises a plunger connected to the inner end of the input rod, a valve body having an axial bore for slidably receiving the plunger, a resilient valve member for cooperating with coaxial valve seats provided respectively on the valve body and the plunger such that when the valve member is separated from the valve seat on the valve body the two chambers are communicated and when the valve member is separated from the valve seat on the plunger one of the two chambers is communicated with a reference pressure. The valve body is connected to or integral with the power piston. The relative axial displacement of the plunger and the valve body is restricted by a restricting member.

The pneumatic booster of the kind aforementioned, generally operates satisfactorily. However, there are shortcomings such that, in actuating the booster, the input rod is sometimes moved excessively inwardly until the restricting member acts to restrict the excessive movement of the plunger relative to the valve body, thereby producing impacting sounds and stopping suddenly the inward movement of the input rod, thereby impairing the feeling in actuating the input rod, and that in releasing the input force applied on the input rod, the input rod and the plunger sometimes retract too quickly until the restricting member acts to restrict the excessive movement of the plunger. Impacting sounds will also be produced and the feeling in operating the input rod also will be impaired.

SUMMARY OF THE INVENTION

An object of the present invention is to avoid the shortcomings aforementioned and, according to the invention, there is provided a resilient member interposed between the restricting member and an adjacent portion of the valve body. Thus, it is possible to prevent noise and to maintain a good pedal feeling in operating the booster.

BRIEF DESCRIPTION OF THE DRAWINGS

Some preferred embodiments will now be explained in connection with the drawings, in which.

DETAILED DESCRIPTION OF THE PREFERRED EMBODIMENTS

Figure 2:
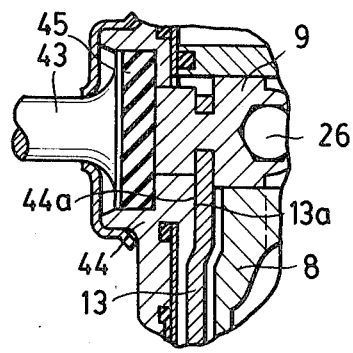
FIG. 2 is a partial view of FIG. 1 but showing a condition in actuating the booster.
Figure 3:
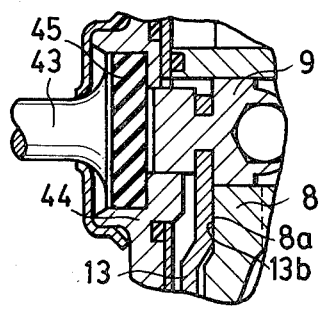
FIG. 3 is a partial view similar to FIG. 2 but showing a conditon in releasing the booster.

Firstly, description will be made with reference the prior art pneumatic booster in FIG. 1-FIG. 3. The pneumatic booster comprises a housing 1 consisting of a front shell 2 and a rear shell 3, a diaphragm and power piston assembly consisting of a flexible diaphragm 4 and a power piston 5 secured to the diaphragm 4, a poppet valve mechanism 6, and input rod 24 and an output rod 43. The diaphragm and power piston assembly partitions the interior of the housing into two chambers, namely, front and rear chambers A and B, respectively. The poppet valve mechanism controls the communication between the chambers A and B and the communication between the chamber B and the atmosphere.

The poppet valve mechanism 6 includes a resilient poppet valve 7, a valve body 8 and a plunger 9. The valve body 8 has on the inner end thereof a large diameter portion 10 to which the radially inner end portion or a flange 11 of the diaphragm 4 is fitted and secured. The valve body 8 further has a central bore receiving slidably the plunger 9, and the relative axial displacement of the plunger 9 in the bore is restricted by a restricting member 13 which is fitted in an annular groove 12 in the outer circumference of the plunger 9. The valve body 8 has a reduced diameter portion 16 extending rightwards, as viewed in FIG. 1, from the large diameter portion 10 and being supported on the rear shell 3 through an annular seal 15 which seals the rear chamber B from the outside. The small diameter portion 16 has a counter bore 17 which receives therein an air filter (not numbered) and also defines a shoulder 18 for retaining a retainer 19. The retainer 19 acts to sealingly retain the outer end 20 of the poppet valve 7 against the inner circumference of the valve body 8. The inner end 21 of the poppet valve 7 acts as a valve member cooperating with an annular valve seat 23 formed on the outer (right) end of the plunger 9 and with an annular coaxial valve seat 41 formed on the valve body 8. A spring 22 urges the end 21 of the poppet valve 7 toward the plunger 9. The input rod 24 is firmly connected to the plunger 9 with the inner end 25 of the input rod 24 being forcibly fitted in a recess 26 in the plunger 9. The outer end of the input rod 24 extends rearwardly from the valve body 8 and is urged rearwardly by a spring 27 which is supported on the retainer 19.

Figure 1:
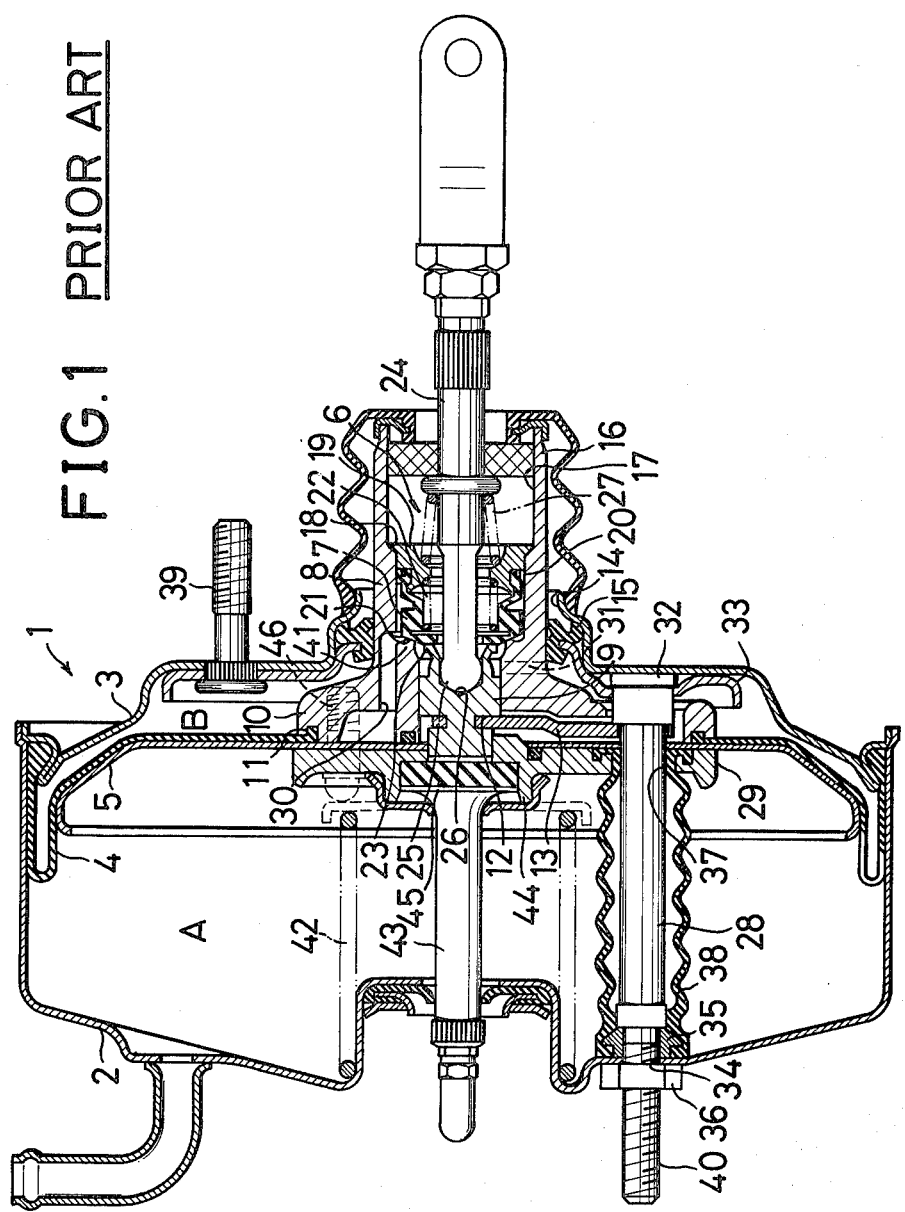
FIG. 1 is a longitudinal sectional view of a typical prior art pneumatic booster.

In the normal nonactuated condition of the booster shown in FIG. 1, the restricting member 13 engages with a shoulder 29 of a rod 28 thereby locating the retracted position of the plunger 9 and the input rod 24. At that condition, the large diameter portion 10 of the valve body 8 may abut with the rear shell 3 to define the retracted position of the valve body. But, preferably, there is provided a small clearance therebetween and the retracted position of the valve body 8 with vacuum pressure prevailing in the chamber A is defined by the condition whereat the poppet valve 7 engages with the valve seat 41 on the valve body 8 and also with the valve seat 23 on the plunger 9.

An axial hole 30 is formed in the large diameter portion 10 of the valve body 8 and a radial hole 31 is formed in the valve body 8, and the holes 30 and 31 act to connect the chambers A and B.

The rod 28 acts to rigidly connect the front and rear shells 2 and 3. Although the drawing shows only one rod 28, preferably, two or more circumferentially spaced rods are provided. A head portion 32 of the rod 28 acts also to rtain an annular reinforcing plate 33. The rod 28 loosely passes through openings in the large diameter portion 10 of the valve body 8 and the power piston 5 respectively and passes through an opening 34 in the shell 2, and is secured to the shell 2 through nuts 35 and 36. A bellows or extensible tube 38 surrounds the rod 28 in the chamber A, with the left end of the bellows tube 38 being sealingly clamped between the front shell 2 and the nut 35. The right end of the bellows tube 38 is sealingly secured to the piston plate 5. Two or more circumferentially spaced stud bolts 39 (only one is shown in FIG. 1) are secured to the reinforcing plate 33 and project rearwardly from the rear shell 3. The stud bolts 39 are utilized to mount the booster on such a body of a vehicle. The front ends of the rods 28 project from the front shell 2 and are utilized to mount such as a master cylinder of a hydraulic braking system of the vehicle coaxially on the front shell 2. The input rod 24 is connected to a brake pedal.

A return spring 42 is interposed between the front shell 2 and the valve body 8 to bias the valve body 8 toward the rear shell 3.

The output rod 43 is mounted on a disc plate 44 which is secured to the large diameter portion 10 of the valve body 8 through a plurality of screws 46 (only one is shown in FIG. 1) interposing therebetween the piston plate 5 and the inner circumference of the diaphragm 4. Thus, the disc plate 44 is integrally connected to the valve body 8. A resilient reaction disc 45 is interposed between the output rod 43 and the disc plate 44.

In operation, the chamber A is connected to a source of vacuum pressure such as an intake manifold of an engine of the vehicle. In the initially assembled condition, the clearance is zero and a spring corresponding such clearance is formed between the poppet valve 7 and either of the valve seats 23 and 41. Assuming that the clearance is positive, a clearance corresponding such clearance is initially formed between the valve seat 23 and the poppet valve 7 and, in applying the vacuum pressure on the chamber A, the power piston and the valve body move leftward to firstly disconnect the chamber B from the atmosphere and, secondly, to slightly separate the valve seat 41 from the poppet valve thereby decreasing the pressure in the chamber B. Thereafter, the valve seat 41 engages with the poppet valve 7 and the predetermined positive clearance is formed between the valve body 8 and the rear shell 3. The chamber B is separated from the chamber A and from the atmosphere, and the pressure in the chamber B is slightly higher than chamber A, but is much lower than the atmospheric pressure.

In applying brakes, the input rod 24 is pushed inwardly upon depressing the brake pedal so that the valve seat 23 on the plunger 9 separates from the poppet valve 7 whereby the atmospheric air is introduced into the chamber B, and a pressure difference is generated between the chambers B and A to act on the power piston 5. An output force is transmitted to the output rod 43 from the power piston 5 through the reaction disc 45 which acts also to transmit a reaction force on the input rod 24 through the plunger 9.

The booster takes an equilibrium condition whereat the poppet valve 7 engages with valve seats 23 and 41, the reaction force is equal to the input force applied on the input rod 24, and an output force having a predetermined boosting ratio with respect to the input force acts on the output rod 43. The restricting member 13 takes an advanced position together with the plunger 9 and along the rod 28.

when the force applied on the input rod 24 is released, the input rod 24 and the plunger 9 move rightwardly due to the spring 27. The valve seat 41 on the valve body 8 separates from the poppet valve 7 thereby connecting the chamber B with the chamber A. The differential pressure between chambers B and A decreases, thus the valve body 8 and the power piston 5 move rightwardly due to the spring 42. The return or nonactuated position of the plunger 9 (and the input rod 24) is defined by the restricting member 13, and the return or inactuated position of the power piston 5 (and the valve body 8) is defined by the valve seat 41 on the valve body 8 engaging with the poppet valve 7.

The restricting member 13 acts to define the return position of the plunger 9 with respect to the housing 1, and also restricts the relative movement of the plunger 9 with respect to the valve body 8 cooperating with surfaces 8a and 44a on the valve body 8 and the disc plate 44. Therefore, there are shortcomings in the prior art booster shown in FIG. 1, that when the input rod 24 is actuated quickly the restricting member 13 sometimes impacts with the surface 44a of the disc plate 44 as shown in FIG. 2, thereby producing noise and impairing the feel of the pedal, and that when the brake pedal is released too quickly, the restricting member 13 sometimes impacts with the surface 8a of the valve body 8 as shown in FIG. 3, thereby producing noise and impairing the feel of the pedal.

The present invention aims to avoid the shortcomings aforementioned.

Figure 4:
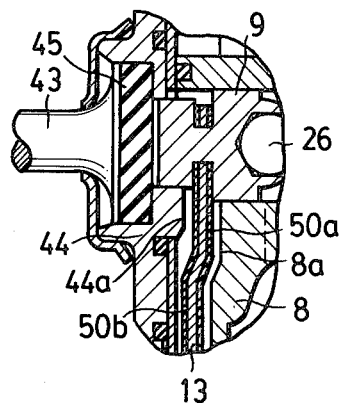
FIGS. 4-8 are respectively partial views of respective embodiments according to the invention.

FIG. 4 shows a first embodiment according to the invention wherein resilient members 50a and 50b are applied on opposite surfaces of restricting member 13a by coating process. The restricting member 13 does not sharply and noisily impact with the surfaces 8a and 44a. Preferably, the restricting members 50a and 50b are formed of such as rubber or the like.

Figure 5:
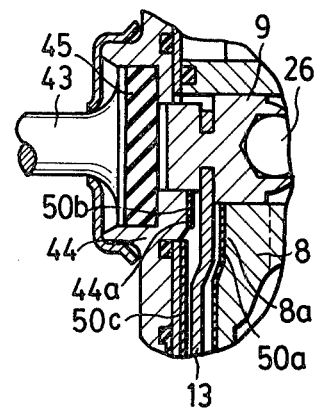

FIG. 5 shows a second embodiment of the invention wherein the surfaces 8a and 44a are coated with resilient members 50a and 50b. The embodiment of FIG. 5 is similar to the first embodiment shown in FIG. 4 in construction and function.

Figure 6:
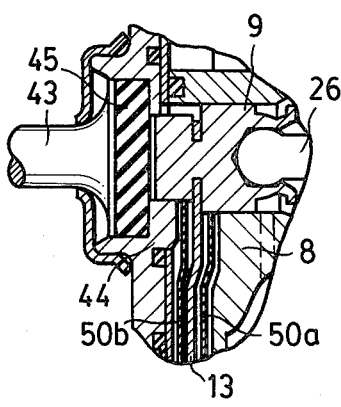

FIG. 6 is a third embodiment of the invention wherein thin resilient plates 50a and 50b are respectively interposed between the restricting member 13 and the valve body 8 and the disc plate 44.

Figure 7:
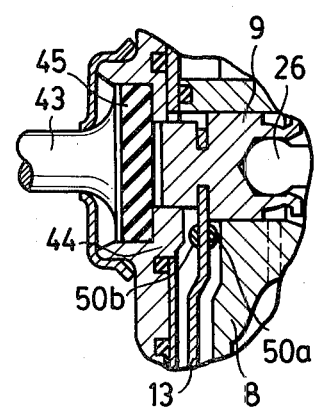

FIG. 7 shows a fourth embodiment wherein a rivet like shaped resilient member is fitted on the restricting member 13 and opposite head portions 50a and 50b act to reduce the impacting force.

Figure 8:
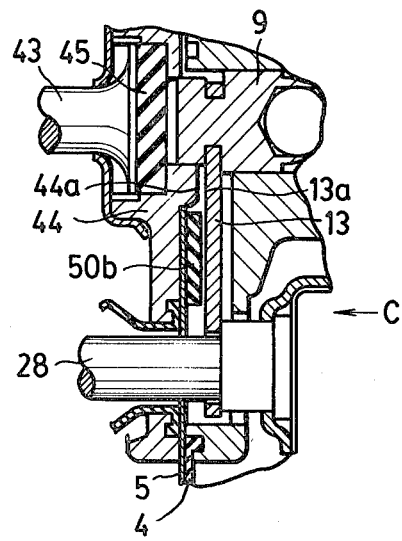
Figure 9:
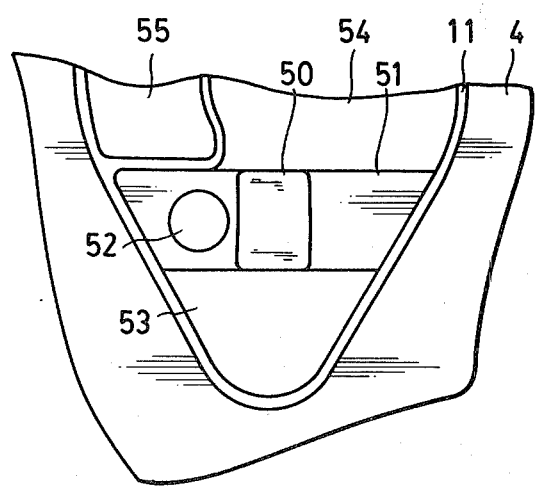
FIG. 9 is a partial view of the diaphragm of FIG. 8 as viewed in the direction of arrow C therein.

According to a fifth embodiment of the invention shown in FIGS. 8 and 9, the resilient member 50b is formed integrally with the diaphragm 4 and is bonded on the piston plate 5. As shown in FIG. 9, the inner circumferential edge or flange portion 11 of the diaphragm 4 has a downwardly extended configuration in the lower half of FIG. 1 and a belt like portion 51 bridges the flange portion 11 to form thereon the resilient member 50b (50 in FIG. 9). Shown at 52 is a hole for passing therethrough a screw similar to the screw 46 in FIG. 1. Shown at 53, 54 and 55 are vacant or open portions of the diaphragm. It will be noted that the embodiment of FIG. 8 has no resilient member between the restricting member 13 and the surface 8a of the valve body, however, the impact between the restricting member 13 and the surface 8a on the valve body 8 is not so large.

It will be understood that the invention is not limited to the embodiments described, and various changes or modifications may easily be applied. For example, the restricting member 13 in the illustrated is firmly mounted on the plunger to restrict the relative axial movement between the plunger and the valve body and to define the nonactuated position of the plunger with respect to the housing. However, the restricting member may be mounted on the plunger or on the valve body to simply restrict the relative axial movement between the plunger and the valve body. Further, the invention may be applied to so-called pressure type pneumatic boosters acting between pressurized air and the atmospheric air or vacuum pressure. Further, the invention may also be applied to so-called tandem type pneumatic boosters wherein the interior of the housing is divided into three or more chambers.

What is claimed is:

1. A pneumatic booster comprising:
   a housing;
   a diaphragm and power piston assembly partitioning the interior of said housing into two chambers, said assembly comprising a flexible diaphragm and a plate-shaped power piston secured to said diaphragm;
   a valve body fixed to said assembly;
   a plunger slidably received in an axial bore in said valve body;
   an input rod having an inner end connected to said plunger;
   a poppet valve cooperable with said valve body and said plunger for, upon movement of said plunger in said bore, selectively connecting or disconnecting communication between said two chambers and selectively connecting or disconnecting communication between one of said chambers and a reference pressure;
   an output rod connected to said power piston;
   a restricting member fitted in an annular groove in the outer circumference of said plunger and axially movable therewith for restricting relative axial movement between said plunger and said power piston and between said plunger and said valve body due to displacement of said plunger toward said power piston and said valve body, respectively; and
   means for preventing sharp impact between said restricting member and said power piston, said preventing means comprising a section of said flexible diaphragm bonded to said plate-shaped power piston, said section including a resilient portion of increased thickness positioned to be abutted by said restricting member upon movement thereof toward said power piston.

2. A pneumatic booster as claimed in claim 1, wherein said diaphragm includes an integral flange portion fixed to said valve body, said diaphragm section comprises a belt-like portion extending between and integral with two parts of said flange portion, and said increased thickness resilient portion extends from said belt-like portion.

* * * * *